(12) United States Patent
Ferris

(10) Patent No.: US 6,603,073 B2
(45) Date of Patent: Aug. 5, 2003

(54) SNAP TOGETHER CABLE TROUGH SYSTEM

(75) Inventor: Matthew D. Ferris, Chaska, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 09/953,571

(22) Filed: Sep. 12, 2001

(65) Prior Publication Data

US 2003/0047343 A1 Mar. 13, 2003

(51) Int. Cl.[7] ................................................ H02G 3/04
(52) U.S. Cl. ..................... 174/68.3; 174/72 A; 174/48
(58) Field of Search ............................. 174/68.3, 72 A, 174/48, 68.1, 69, 70 C, 99 E, 100, 101; 361/826; 220/3.3; 248/49; 52/220.7, 220.1; 385/100, 134

(56) References Cited

U.S. PATENT DOCUMENTS

| 834,828 A | 10/1906 | Lutz |
| 2,823,056 A | 2/1958 | Di Meo et al. |
| 2,834,622 A | 5/1958 | Reeves |
| 3,042,351 A | 7/1962 | Du Bois |
| 3,351,699 A | 11/1967 | Merckle |
| 4,105,051 A | 8/1978 | Visentin |
| 4,570,437 A | 2/1986 | Moritz |
| 4,627,469 A | 12/1986 | Buard |
| 4,658,577 A | 4/1987 | Klein |

(List continued on next page.)

FOREIGN PATENT DOCUMENTS

| DE | 3636412 A1 | 4/1988 |
| EP | 0 315 023 A2 | 5/1989 |
| FR | 2 365 902 | 4/1978 |
| GB | 549840 | 12/1942 |
| GB | 612162 | 11/1948 |
| GB | 1 342 085 | 12/1973 |
| SU | 920930 | 4/1982 |
| WO | WO 02/18991 A1 | 3/2002 |

OTHER PUBLICATIONS

ADC Telecommunications brochure entitled "Fiber Guide™ Fiber Management System," 6 pages (Jun. 1989).
ADC Telecommunications brochure entitled "FiberGuide® Fiber Management Systems," 33 pages (Oct. 1995).
ADC Telecommunications brochure entitled "FiberGuide® Fiber Management Systems," 37 pages (Jun. 1998).
ADC Telecommunications brochure entitled "ADC Fiber-Guide® System Express Exit™ 2×2," 2 pages (May 1999).
ADC Telecommunications brochure entitled "FiberGuide® Fiber Management Systems," 56 pages (Sep. 2000).
Warren & Brown & Staff brochure pages entitled "light-paths," Issue 2, 11 pages (1995).

Primary Examiner—Chau N. Nguyen
Assistant Examiner—Jinhee J Lee
(74) Attorney, Agent, or Firm—Merchant & Gould P.C.

(57) ABSTRACT

A cable management assembly and method of assembly. The trough assembly includes first and second trough members each having first and second upstanding sidewalls extending from a base defining a generally U-shaped trough which defines first and second cable pathways respectively for receiving at least one telecommunications cable. A first end of the first trough member and a second end of the second trough member define a snap-together mating arrangement which couples through longitudinal sliding movement the first trough member to the second trough member so that the first cable pathway communicates with the second cable pathway.

7 Claims, 7 Drawing Sheets

U.S. PATENT DOCUMENTS

| | | | |
|---|---|---|---|
| 5,067,678 A | 11/1991 | Henneberger et al. |
| 5,160,811 A | 11/1992 | Ritzmann |
| 5,161,580 A | 11/1992 | Klug |
| 5,240,209 A | 8/1993 | Kutsch |
| 5,271,585 A | 12/1993 | Zetena, Jr. |
| 5,276,596 A | 1/1994 | Krenzel |
| 5,283,393 A * | 2/1994 | Guginsky | 174/102 R |
| 5,316,243 A | 5/1994 | Henneberger |
| 5,316,244 A | 5/1994 | Zetena, Jr. |
| 5,335,349 A | 8/1994 | Kutsch et al. |
| 5,503,354 A | 4/1996 | Lohf et al. |
| 5,663,527 A * | 9/1997 | Hui | 174/101 |
| 5,752,781 A | 5/1998 | Haataja et al. |
| 5,792,992 A | 8/1998 | Handler |
| 5,836,148 A | 11/1998 | Fukao |
| 5,839,476 A | 11/1998 | Blase |
| 5,923,753 A | 7/1999 | Haataja et al. |
| 5,937,131 A | 8/1999 | Haataja et al. |
| 5,995,699 A | 11/1999 | Vargas et al. |
| 6,037,538 A | 3/2000 | Brooks |
| 6,076,779 A | 6/2000 | Johnson |
| 6,118,075 A * | 9/2000 | Baker et al. | 174/100 |
| 6,156,974 A | 12/2000 | Blase |
| 6,170,249 B1 | 1/2001 | Blase et al. |
| 6,242,698 B1 * | 6/2001 | Baker et al. | 174/59 |
| 6,263,144 B1 | 7/2001 | Daoud |
| 6,270,287 B1 | 8/2001 | Gray |
| 6,298,191 B1 | 10/2001 | Daoud |

* cited by examiner

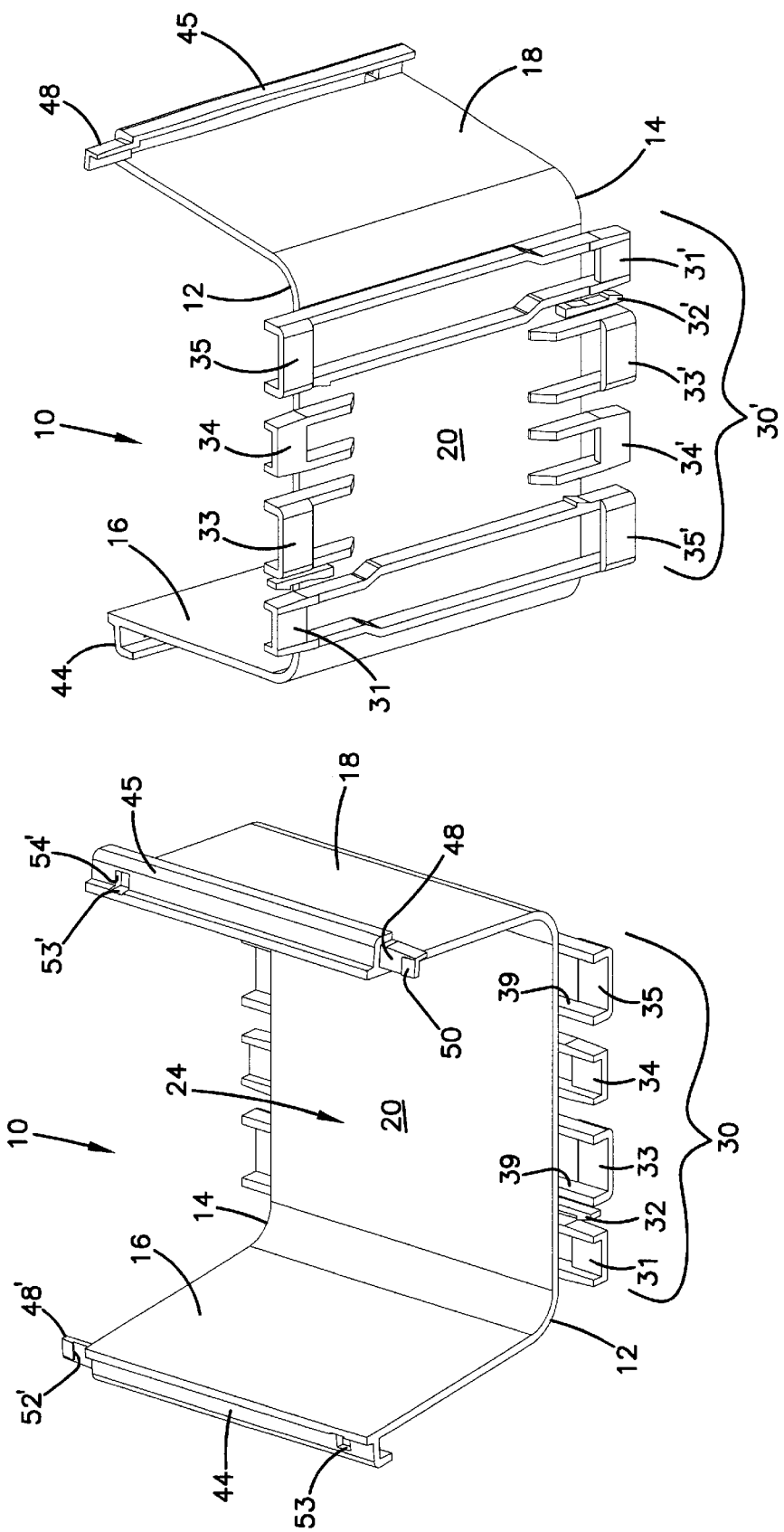

SNAP TOGETHER CABLE TROUGH SYSTEM

FIELD OF THE INVENTION

This invention pertains to a system for the management and routing of cables, such as telecommunications cables. More particularly, this invention pertains to a cable trough member.

BACKGROUND OF THE INVENTION

In the telecommunications industry, the use of optical fibers for signal transmission is accelerating. With the increased utilization of optical fiber systems, optical fiber cable management requires industry attention. Similar issues exist with other telecommunications cables such as copper-based cables.

One area of telecommunications cable management that is necessary is the routing of cables from one piece of equipment to another. For example, in a telecommunications facility, optical fiber cables or other cables may be routed between fiber distribution equipment and optical line terminating equipment. In buildings and other structures which carry such equipment, the cable routing can take place in concealed ceiling areas or in any other manner to route cables from one location to another. Accordingly, such routing systems often include a plurality of trough members, fittings and couplings for routing the cables.

When routing optical fibers, it is desirable that the routing system will be easy to install. Prior trough systems use coupling members with fasteners such as screws to couple the ends of two trough members. There is a need for devices which make system installation easier and less reliant on additional coupling pieces and fasteners.

SUMMARY OF THE INVENTION

The present invention concerns trough members for use in a trough system. The trough members may be quickly and easily snap-fitted together through the use of a mating arrangement. The trough members include upstanding sidewalls extending from a base defining a generally U-shaped trough. The trough provides a cable pathway for receiving at least one telecommunications cable. A first end of the trough members define a snap-together mating arrangement having male and female coupling members which mate through longitudinal sliding movement of a first trough member relative to a second trough member so that the bases abut each other to form a flush surface.

In a preferred embodiment of the trough member according to the present invention, the trough member has a two ends which having identical, mirror-image coupling members so that the trough member can be coupled to two identical trough members.

The present invention also relates to a method for quickly and easily assembling a cable management trough assembly which includes the steps of providing first and second trough members having male and female coupling members at coupling ends of the first and second trough members, aligning the coupling end of the first trough member with the coupling end of the second trough member so that the male members are aligned with openings of the female members, and sliding the first trough member longitudinally relative to the second trough member so that the male members are received in the openings of the female members.

BRIEF DESCRIPTION OF THE DRAWINGS

FIG. 1 is a top perspective view of a trough member according to the present invention having identical ends.

FIG. 2 is a bottom perspective view of the trough member of FIG. 1.

DETAILED DESCRIPTION

The present invention concerns a cable guide members having ends with a snap-fitting mating arrangement. The guide members, such as troughs, may be used within a cable management system that may include additional horizontal trough members, vertical sections, junctions and couplings. The trough members of the present invention allow two trough members having identical ends to be coupled together without the need for an additional coupling member or a fastener. Instead, the members are coupled by sliding engagement of male and female coupling members to form a mating arrangement. Notably, there is no need to manufacture two separate pieces, one having a male end and one having a female end. The mating ends are identical. The trough members are held together by opposing edges. It is to be understood that "snap-fit" means the two trough members can be coupled by sliding engagement of opposing edges of the trough members to form a mating arrangement without the need for an additional coupling piece, fastener, or tool.

The preferred embodiment shown in the Figures is a straight trough member. The present invention, however, may be used with cable guide members of any number of different shapes, for example, elbows troughs, tee-troughs, upwardly or downwardly angled troughs, junction troughs, troughs with exits or downspouts, or any other cable guide member. Different cable guide members having identical coupling ends according to the present invention may also be snap-fit together, for instance, a tee-trough member may be coupled to a straight trough member.

Figure 3:
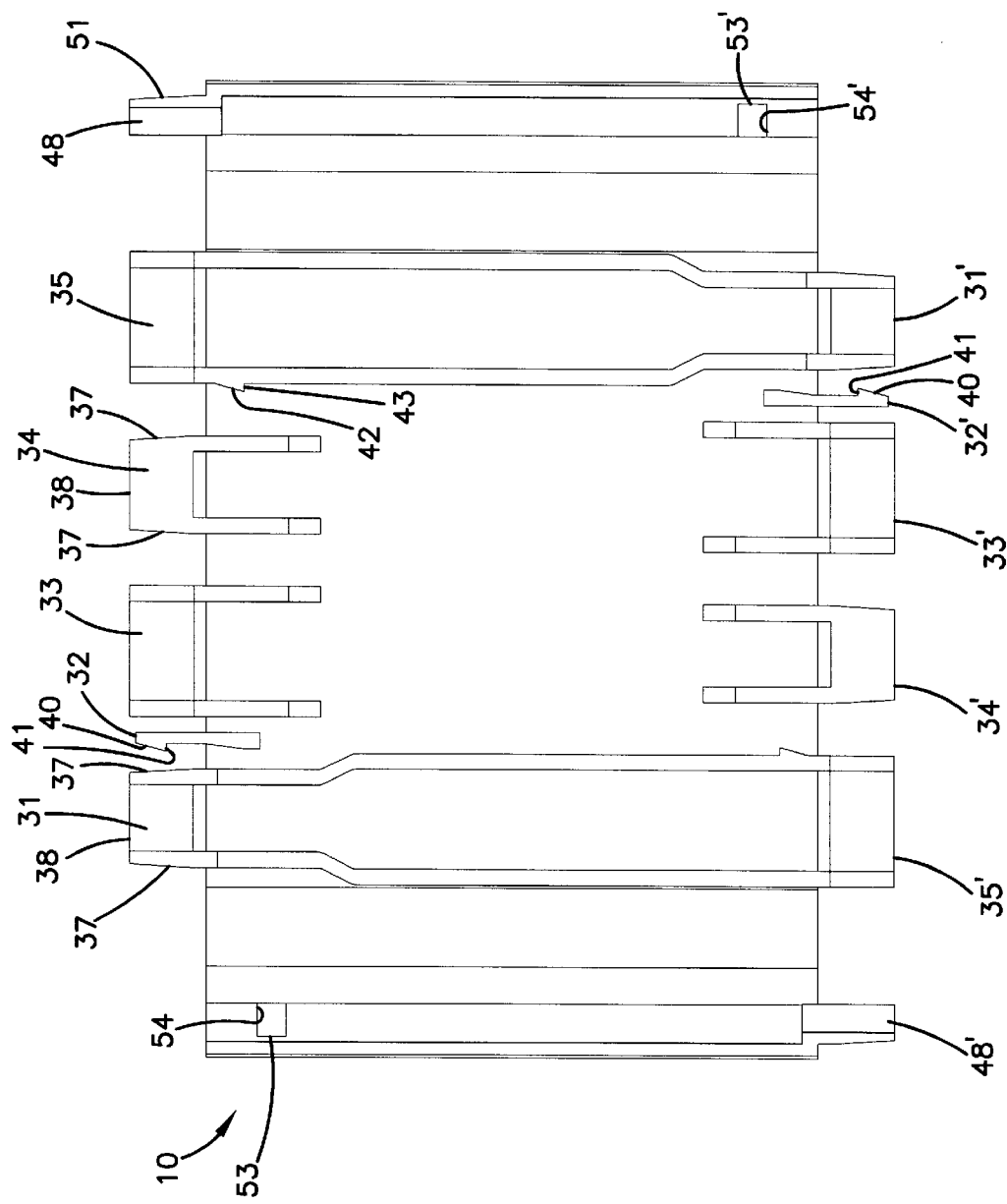
FIG. 3 is a bottom view of the trough member of FIG. 1.
Figure 5:
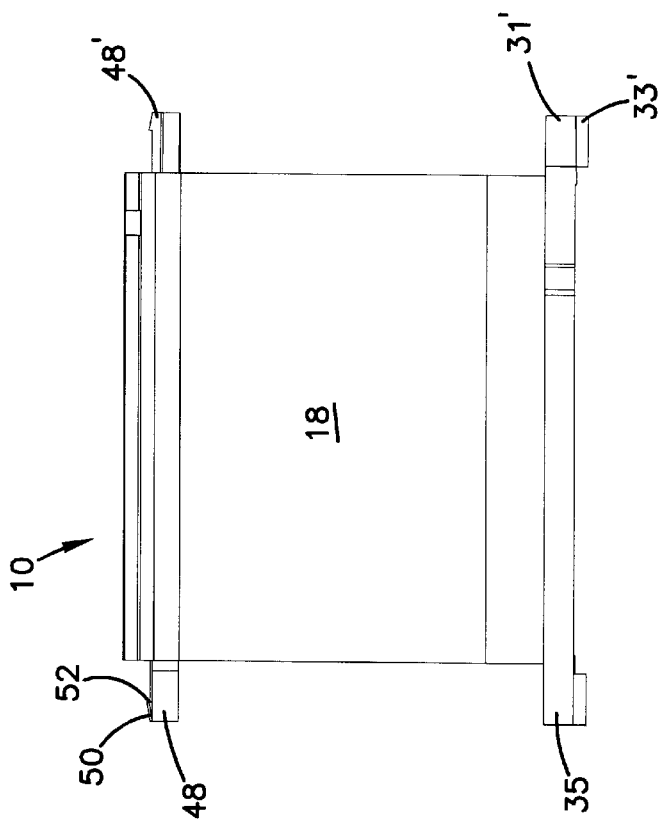
FIG. 5 is a side view of the trough member of FIG. 1.
Figure 4:
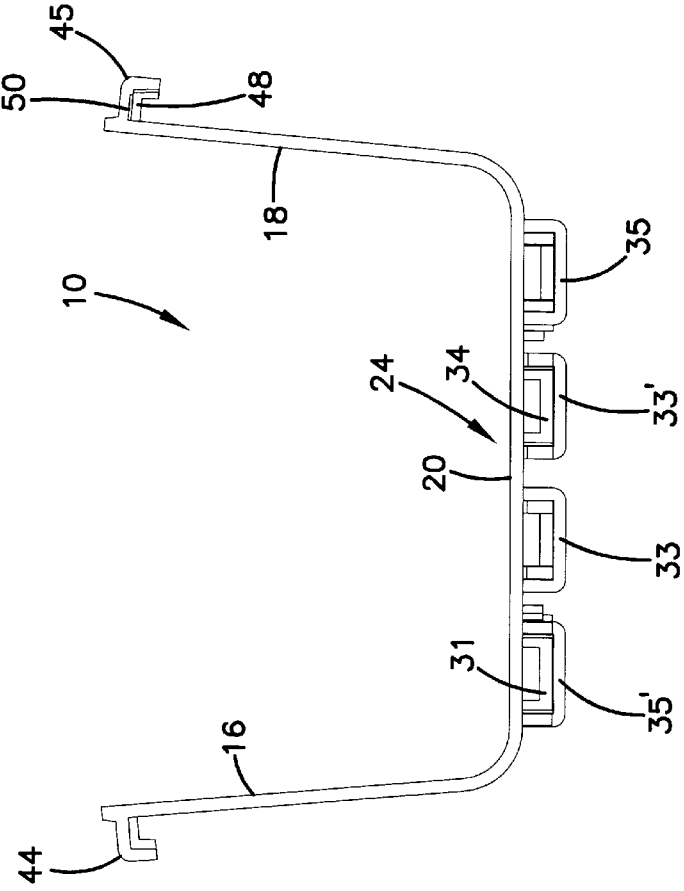
FIG. 4 is an end view of the trough member of FIG. 1.

Referring now to FIGS. 1–5, a trough member 10 is shown having ends 12, 14. Trough member 10 includes generally vertical or upright sidewalls 16, 18, and a connecting horizontal base or bottom wall 20. Trough member 10 defines an open top. Together, the base 20 and the sidewalls 16 and 18 define a generally continuous U-shaped cross-section as best shown in FIG. 4. The U-shaped trough defines an interior which provides a cable pathway 24 for receiving one or more telecommunications cables. The pathway 24 is oriented in the longitudinal direction generally parallel to the sidewalls 16 and 18.

Figure 6:
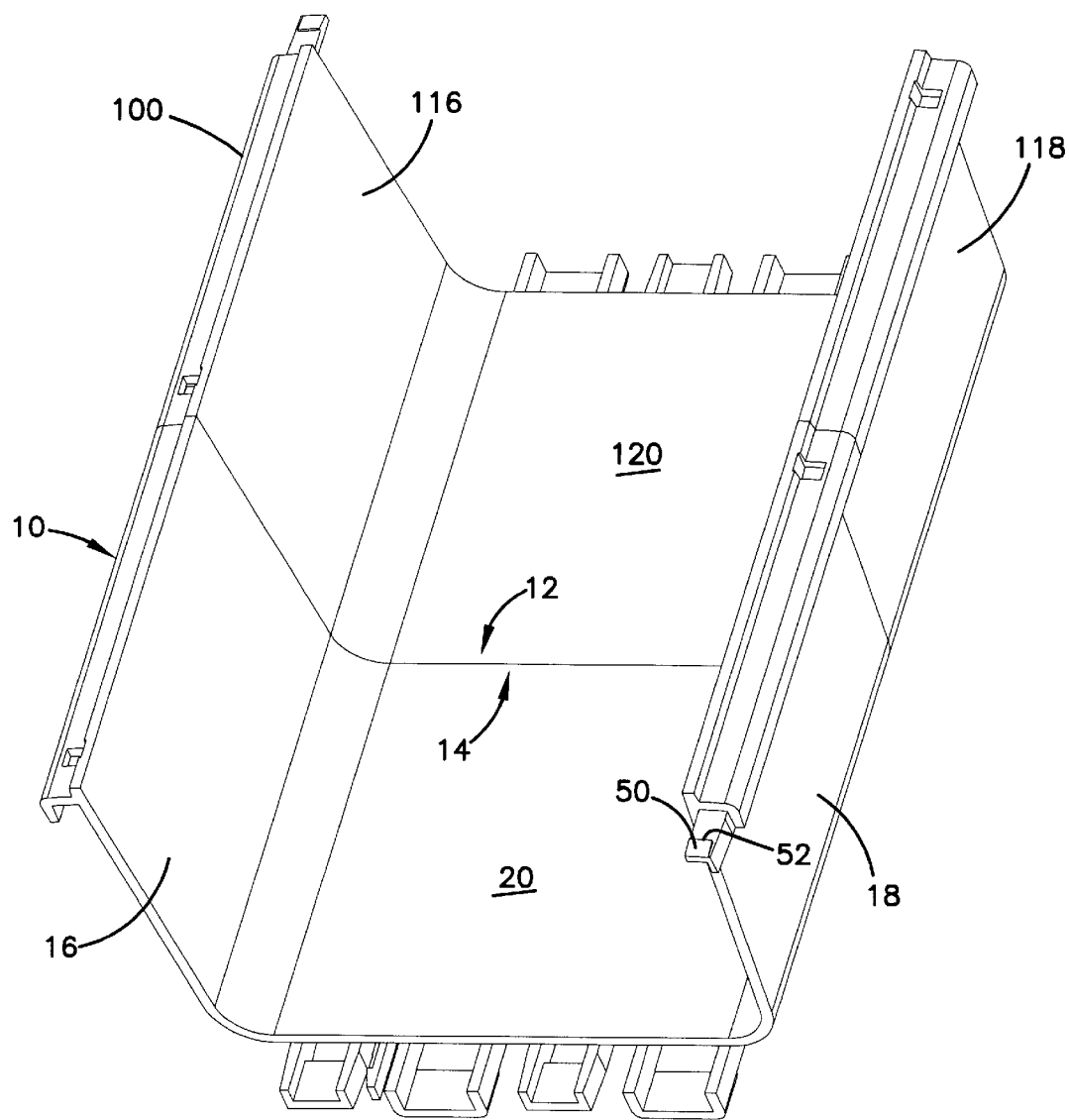
FIG. 6 is a top perspective view of a cable trough assembly according to the present invention combining two trough members with ends identical to the ends of the trough member of FIG. 1.
Figure 7:
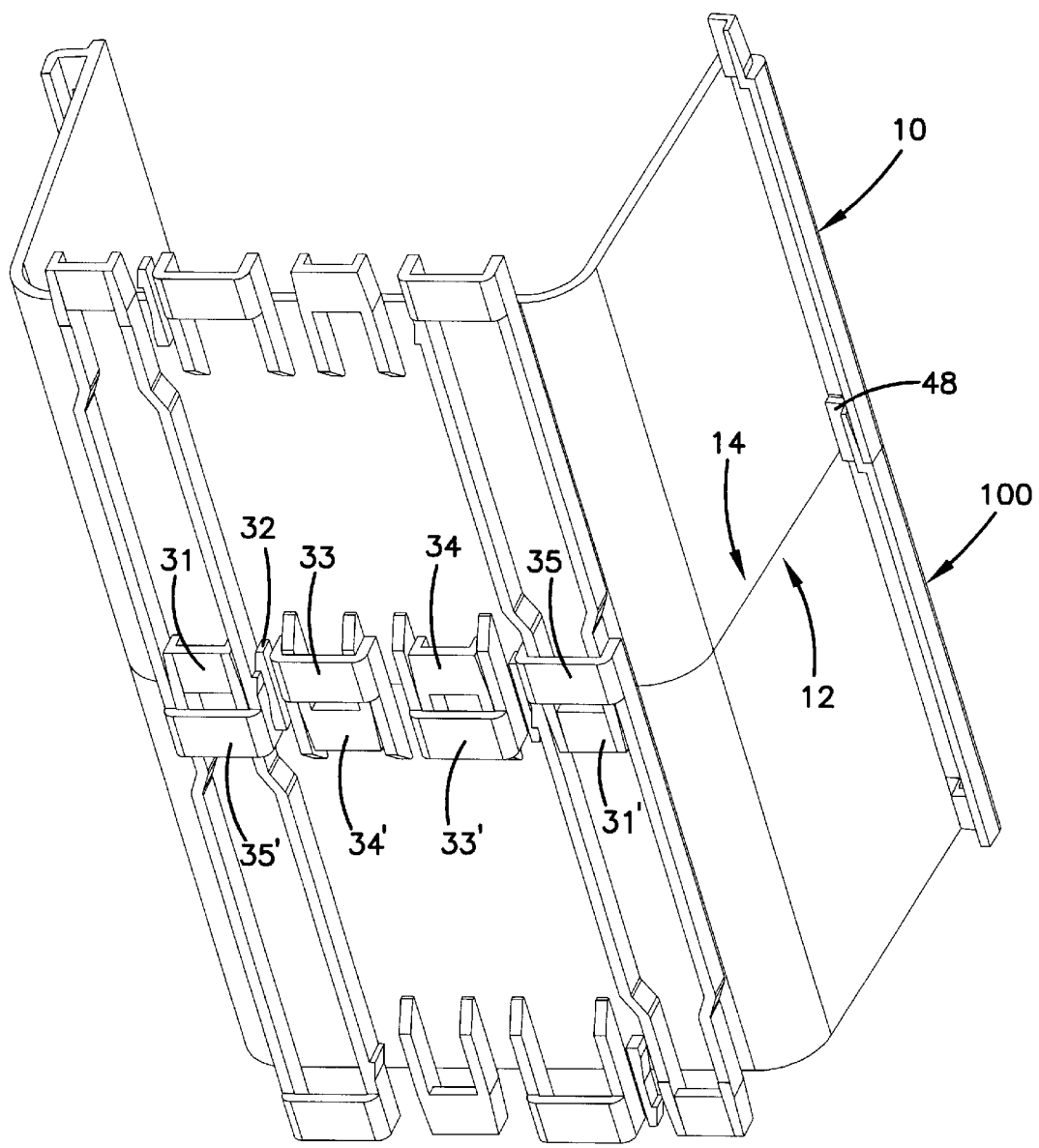
FIG. 7 is a bottom perspective view of the cable trough assembly of FIG. 6.
Figure 8:
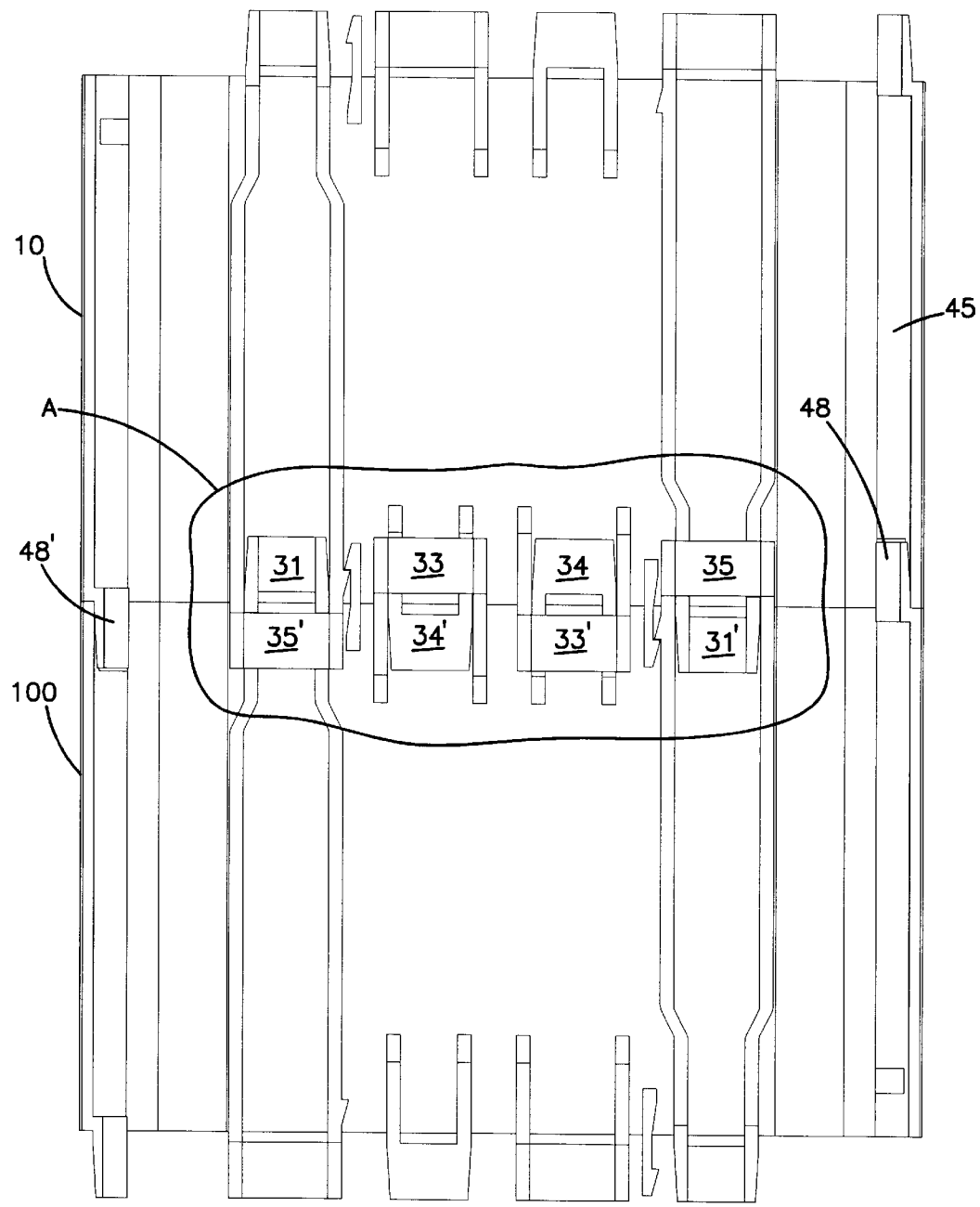
FIG. 8 is a bottom view of the cable trough assembly of FIG. 6.

End 12 includes a first set 30 of coupling members 31–35 extending from an outside surface of the base 20. End 14 includes an identical set 30' of coupling members 31'–35'. As shown in FIGS. 6–8 the first set 30 of coupling members 31–35 snap-fit in a mating arrangement with second set 30' of coupling members to couple trough members 10 and 100.

Sets 30 and 30' of coupling members include first and second male coupling members 31, 34 and 31', 34' respectively. Male coupling members are U-shaped brackets. The male coupling members 31, 34 and 31', 34' preferably have tapered sides 37 so that the male coupling members narrow toward their extreme ends 38. Coupling members 33, 35 and 33', 35' are female coupling members. Female coupling members 33, 35 and 33', 35' are also U-shaped brackets. The female coupling members 33, 35 and 33', 35' are shaped to define openings 39 for receiving male coupling members sized as male coupling members 31, 34 and 31', 34'. The male coupling members can be slid in the longitudinal direction to fit inside corresponding female coupling members of another trough member.

Figure 9:
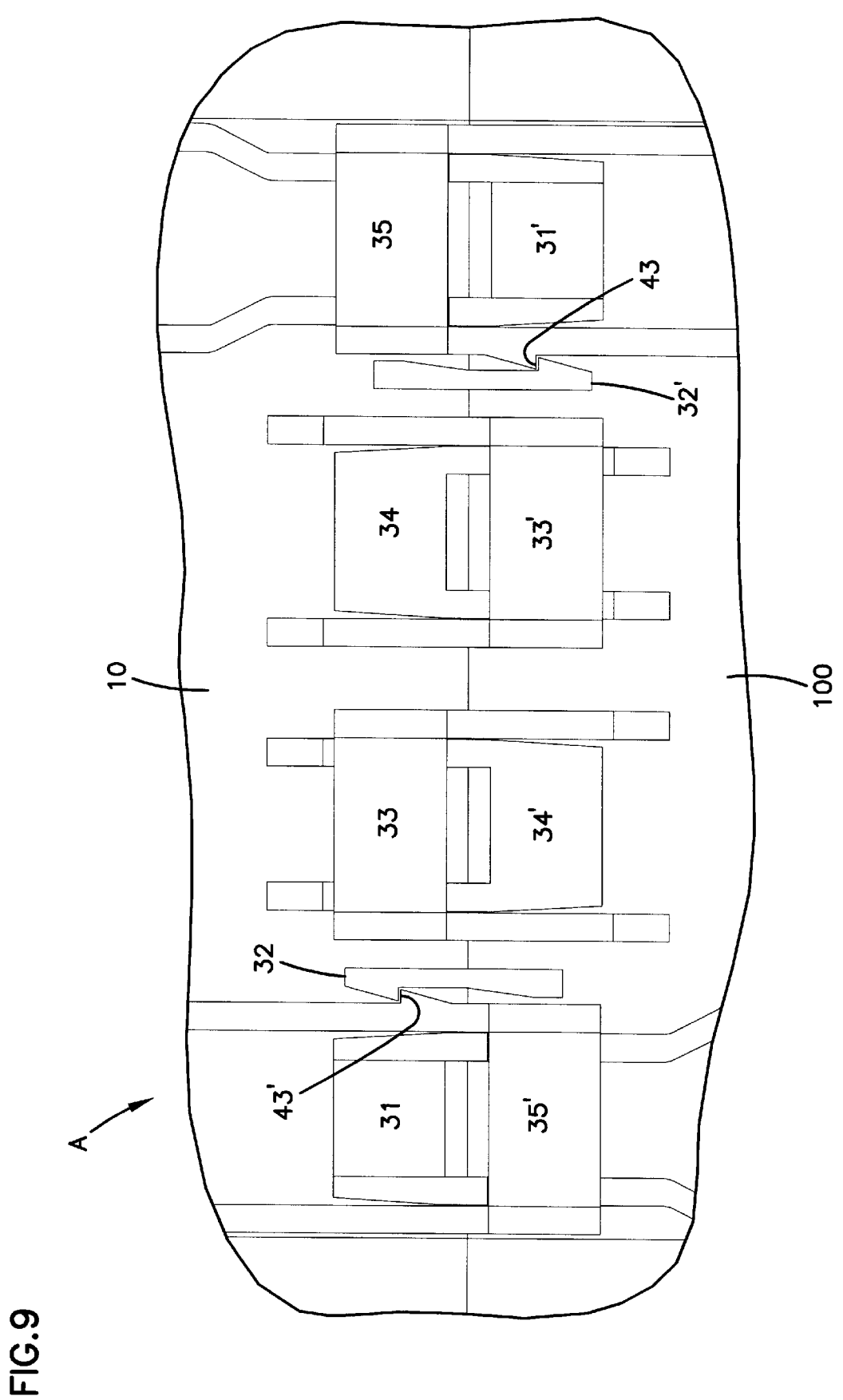
FIG. 9 is a detail view of the mating arrangement of the trough assembly labeled A in FIG. 8.

Preferably, trough member 10 includes coupling members that can prevent longitudinal separation once assembled. Coupling member 32 includes a ramped surface 40 with an opposite edge 41. Coupling member 35 includes a ramped surface 42 with an opposite edge 43. As shown in FIG. 9 opposite edges 41 and 43 engage to prevent two coupled trough members from separating. Coupling member 32 may be made flexible to aid in separating two trough members if desired by deflecting the coupling member from engagement with opposite edge 43.

Trough member 10 includes outwardly extending, L-shaped flanges 44 and 45 along a top portion of each sidewall 16 and 18. At end 12, a tab 48 extends longitudinally from flange 45. Tab 48 includes a ramped surface 50 with an opposite edge 52. Side surface 51 of tab 48 is tapered toward the end of the tab 48 (see FIG. 3). Also at end 12, flange 44 defines an aperture 53 having an edge 54. Edge 54 is oriented to engage a mirror image opposite edge 52' of tab 48' on end 14 of an identical trough member.

As shown in FIGS. 6–9, trough member 10 may be snap-fit to an identical trough member 100 or any other cable guiding member having an end identical to end 12 or 14 of trough member 10. End 14 of trough member 10 is aligned with end 12 of trough member 100 so that male coupling members 31' and 34' of trough 10 are received into female coupling members 35 and 33 of trough 100. Similarly, female coupling members 33' and 35' of trough 10 receive male coupling members 34 and 31 of trough member 100. Coupling member 32 of trough 100 engages edge 43' of coupling member 35'. Similarly, coupling member 32' of trough 10 engages edge 43 of trough 100. The opposing edges prevent the trough members from separating once they are snap-fitted to each other. In addition, tabs 48 and 48' are received beneath flanges 44' and 44 respectively so that edges 50 and 50' engage edges 54' and 54 respectively to prevent separation of the trough members.

When trough members 10 and 100 are coupled as an assembly, the base 20 and sidewalls 16 and 18 of trough member 10 form a butt joint with base 120 and sidewalls 116 and 118 of trough member 100. The butt joint of the assembly of trough members is formed by an end-to-end meeting of the respective bases and sidewalls to form a flat, continuous transition between the cable pathway of the trough member 10 to the cable pathway of trough member 100. In other words, the interior surface of base 10 is flush with the interior surface of base 110, forming an unbroken, combined base surface.

With cable troughs according to the present invention, a cable trough assembly can be assembled by aligning identical ends of two cable trough components so that the male coupling members of the first cable trough are aligned with corresponding female coupling members of the second cable trough. The first cable trough is then slid longitudinally relative to the second cable trough so that the male coupling members are received by the female coupling members until the base of the first trough flush abuts the base of the second trough so that the cable pathway of the first trough member communicates with the cable pathway of the second trough member. Opposing edges snap into engagement with each other once the coupling end of the first cable trough abuts the coupling end of the second cable trough.

The above specification, and preferred embodiment provide a description of the invention. Various alterations may be made to the preferred embodiment described above which would still fall within the scope of the invention. For instance, the coupling members may be located on the sidewalls instead of the base, or the number, size or configuration of the coupling members may be varied. Since many embodiments of the invention can be made without departing from the spirit and scope of the invention, the invention resides in the claims hereinafter appended.

What is claimed is:

1. A cable management trough assembly comprising:

a first trough member having first and second upstanding sidewalls extending from a base defining a generally U-shaped trough which defines a first cable pathway for receiving at least one telecommunications cable, the first trough member having first and second ends;

a second trough member having first and second upstanding sidewalls extending from a base defining a generally U-shaped trough which defines a second cable pathway for receiving at least one telecommunications cable, the second trough member having first and second ends;

wherein the first end of the first trough member and the second end of the second trough member define a snap-together mating arrangement which couples, through longitudinal sliding movement, the first trough member to the second trough member so that the base of the first trough member abuts the base of the second trough member to form a flush surface and so that the first cable pathway communicates with the second cable pathway;

wherein the mating arrangement includes a first set of coupling members disposed on an outer side of the U-shaped trough of the first trough member and extending from the first end of the trough member, the mating arrangement including a second set of coupling members disposed on an outer side of the U-shaped trough of the second trough member and extending from the second trough end of the second trough, the first set of coupling members mated with the second set of coupling members; and wherein at least one coupling member of the first set of coupling members includes a first ramped surface with and opposite edge, and wherein at least one coupling member of the second set of coupling members includes a second ramped surface with an opposite edge, the opposite edge of the first ramped surface opposing the opposite edge of the second ramped surface to prevent the first trough member from separating from the second trough member longitudinally.

2. The cable management trough assembly of claim 1 wherein the first set of coupling members includes a first male coupling member and a first female coupling member, and wherein the second set of coupling members includes a first male coupling member and a first female coupling member.

3. The cable management trough assembly of claim 2 wherein the male coupling member of the first set of coupling members is received within the female coupling member of the second set of coupling members, and wherein the male coupling member of the second set of coupling members is received within the female coupling member of the first set of coupling members.

4. The cable management trough assembly of claim 3 wherein the first set of coupling members includes a second male coupling member and a second female coupling member and wherein the second set of coupling members includes a second male coupling member and a second female coupling member, the second male coupling member of the first set of coupling members being received within the second female coupling member of the second set of coupling members, the second male coupling member of the second set of coupling members being received within the second female coupling member of the first set of coupling members.

5. The cable management trough assembly claim 1 wherein the first sidewall of the first trough member includes a tab having a ramped surface with an opposite edge, the tab extending from the first end of the trough member, and wherein the opposite edge of the tab of the first trough member opposes a second edge defined by the second trough member to prevent the first trough member from separating from the second trough member longitudinally.

6. The cable management trough assembly of claim 1 wherein the first end of the first trough member is identical to the second end of the second trough member.

7. The cable management trough assembly of claim 1 wherein the first end of the first trough member is identical to the second end of the first trough member.

* * * * *